United States Patent

Nakajima

[11] Patent Number: 6,055,488
[45] Date of Patent: Apr. 25, 2000

[54] DEVICE FOR CALCULATING INITIAL CORRECTION FACTOR FOR CORRECTING ROTATIONAL VELOCITY OF TIRE

[75] Inventor: Yoshio Nakajima, Itami, Japan

[73] Assignees: Sumitomo Electric Industries, Ltd., Osaka; Sumitomo Rubber Industries, Ltd., Hyogo, both of Japan

[21] Appl. No.: 09/020,509

[22] Filed: Feb. 9, 1998

[30] Foreign Application Priority Data

Feb. 27, 1997 [JP] Japan .................................. 9-044066

[51] Int. Cl.⁷ ...................................................... G01P 3/42
[52] U.S. Cl. .............................................. 702/96; 702/97
[58] Field of Search ............................. 702/141, 66, 85, 702/86, 96, 97–107, 142, 145, 146–148, 189

[56] References Cited

U.S. PATENT DOCUMENTS

| | | | |
|---|---|---|---|
| 5,060,747 | 10/1991 | Eto | 180/197 |
| 5,172,318 | 12/1992 | Meissner et al. | 364/426.02 |
| 5,252,946 | 10/1993 | Walker et al. | 73/146.2 |
| 5,292,184 | 3/1994 | Takata | 303/147 |
| 5,299,131 | 3/1994 | Haas et al. | 73/510 |
| 5,369,580 | 11/1994 | Monji et al. | 364/424.01 |
| 5,479,811 | 1/1996 | Baumann et al. | 73/1.37 |
| 5,699,251 | 12/1997 | Mori et al. | 701/97 |
| 5,701,248 | 12/1997 | Wanke | 364/426.01 |
| 5,725,067 | 3/1998 | Ikeda et al. | 701/10 |

FOREIGN PATENT DOCUMENTS 2281134A 2/1995 United Kingdom .

*Primary Examiner*—Marc S. Hoff
*Assistant Examiner*—Craig Steven Miller
*Attorney, Agent, or Firm*—Rabin & Champagne, P.C.

[57] ABSTRACT

A device for calculating a correction factor for correcting an output of a rotational velocity detecting device for detecting the rotational velocities of right and left tires mounted on a vehicle. Discrimination between a state where the vehicle is traveling linearly and a state where the vehicle is traveling on a curved path is made on the basis of the output of the rotational velocity detecting device. Only when it is judged that the vehicle is traveling linearly, an initial correction factor for eliminating the effect of a difference in effective rolling radius between the tires, depending on an initial difference on the rotational velocities of the tires, is calculated.

20 Claims, 9 Drawing Sheets

DEVICE FOR CALCULATING INITIAL CORRECTION FACTOR FOR CORRECTING ROTATIONAL VELOCITY OF TIRE

BACKGROUND OF THE INVENTION

1. Field of the Invention

The present invention relates to an initial correction factor calculating device used for a tire pressure drop detecting device, for example, for finding an initial correction factor for eliminating the effect on the rotational velocities of the tires of a difference in effective rolling radius that depends on an initial difference between tires.

2. Description of Related Art

In recent years, as an example of a safety device of a four-wheel vehicle such as an automobile or a truck, devices for detecting the drop in air pressure of a tire (DWS) have been developed, and some of them have-been put to practical use.

An example of a method of detecting the drop in air pressure of a tire is a method utilizing a difference among the respective rotational velocities $F_1$, $F_2$, $F_3$, and $F_4$ of four tires $W_1$, $W_2$, $W_3$, and $W_4$ mounted on a vehicle. This method utilizes the fact that the rotational velocity $F_i$ (i=1, 2, 3, 4) changes depending on the conditions of the air pressure of the tire $W_i$. That is, when the air pressure of any one of the tires $W_i$ drops, the effective rolling radius of the tire $W_i$ decreases. As a result, the rotational velocity $F_i$ of the tire $W_i$ increases. Therefore, the drop in the air pressure of the tire $W_i$ can be judged on the basis of a difference in the rotational velocity $F_i$.

The effective rolling radius is a value obtained by dividing by $2\pi$ the travel distance of the tire $W_i$ when freely rolling one rotation in a loaded state.

A judgment expression used in detecting the drop in the air pressure of the tire $W_i$ on the basis of the difference in the angular velocity $F_i$ is the following equation (1):

$$D = \frac{\frac{F_1 + F_4}{2} - \frac{F_2 + F_3}{2}}{\frac{F_1 + F_2 + F_3 + F_4}{4}} \times 100 \quad (1)$$

(see, for example, Japanese Patent Laid-Open No. 305011/1988, Japanese Patent Laid-Open No. 212609/1992)

If all the effective rolling radii of the tires $W_i$ are the same, the respective rotational velocities $F_i$ are the same ($F_1=F_2=F_3=F_4$). Consequently, a judged value D is zero. Therefore, thresholds $D_{TH1}$ and $D_{TH2}$ (where $D_{TH1}$, $D_{TH2}$>0) are set. When the condition given by the following expression (2) is satisfied, it is judged that there is a tire $W_i$ whose air pressure drops. When the condition is not satisfied, it is judged that all the tires $W_i$ have normal internal pressure.

$$D < -D_{TH1} \text{ or } D > D_{TH2} \quad (2)$$

The effective rolling radius of the actual tire $W_i$ includes a variation within a production tolerance (hereinafter referred to as an "initial difference"). That is, even if all the four tires $W_i$ have normal internal pressure, the effective rolling radii of the four tires $W_i$ differ depending on the initial difference. Correspondingly, the rotational velocities $F_i$ of the tires $W_i$ vary. As a result, the judged value D may be a value other than zero. Therefore, it may be erroneously judged that the air pressure drops, although it does not drop. In order to detect the drop in the air pressure with high precision, therefore, it is necessary to eliminate the effect of the initial difference from the detected rotational velocity $F_i$.

As a technique for eliminating the effect of the initial difference from the rotational velocity $F_i$, it is considered that a technique disclosed in Japanese Patent Laid-open No.318584/1995 is applied. In the technique, the ratio of the rotational velocities of right and left following (rear) tires is calculated. Further, a time-differentiated value of the ratio of the rotational velocities is calculated. It is judged whether or not the time-differentiated value remains at not more than a predetermined limit value over a predetermined time period. If the time-differentiated value remains at not more than the limit value over the predetermined time period, it is judged that the vehicle is traveling linearly. An initial correction factor is calculated on the basis of the rotational velocities $F_i$ calculated at this time.

The initial correction factor is calculated only when it is judged that the vehicle is traveling linearly. Therefore, the calculation is not affected by the difference between the rotational velocities $F_i$ of inner and outer tires which occurs at the time of cornering. Therefore, an initial correction factor faithfully representing a variation in effective rolling radius which depends on an initial difference between tires $W_i$, should be calculable.

In the above-mentioned prior art, however, a time-differentiated value of the ratio of the rotational velocities of right and left following tires is used as a basis for judging whether a vehicle is traveling linearly. Therefore, it may, in some cases, be erroneously judged that the vehicle is traveling linearly, although it is cornering.

Specifically, when the vehicle is traveling on a road having an almost constant radius of curvature (hereinafter referred to as a "constant-R road"), for example, an exit road leading to a tollgate from an exit of a main lane in an interchange of a highway, it is erroneously judged that the vehicle is traveling linearly. More specifically, when the vehicle is traveling on such a constant-R road, a time-differentiated value of the ratio of the angular (rotational) velocities is relatively small, and is hardly changed. In this case, it is judged that the time-differentiated value of the ratio of the angular velocities remains at not more than the limit value, and it is erroneously judged that the vehicle is traveling linearly.

In this case, therefore, an initial correction factor which is affected by a variation in the rotational velocity $F_i$ caused by cornering is calculated, whereby the rotational velocity $F_i$ is erroneously corrected. As a result, the drop in air pressure of a tire is erroneously judged.

SUMMARY OF THE INVENTION

An object of the present invention is to provide an initial correction factor calculating device capable of reliably discriminating a state where a vehicle is traveling linearly from the state where it is not (the other state), and consequently, obtaining an initial correction factor faithfully representing a difference in effective rolling radius depending on an initial difference between tires.

Another object of the present invention is to provide a method of calculating an accurate initial correction factor by reliably discriminating a state where a vehicle is traveling linearly traveling from the other state.

A device according to the present invention is a device for calculating a correction factor for correcting an output of a rotational velocity detection means used for detecting the rotational velocities of right and left tires mounted on a vehicle. The device comprises a traveling state judging means for judging whether the vehicle is linearly traveling or the vehicle is traveling on a curved path, on the basis of the output of the rotational velocity detection means. The device also includes a factor calculation means for finding an initial correction factor for eliminating the effect on the rotational velocities of the tires of a difference in effective rolling radius between the tires which difference depends on an initial difference. The correction factor is calculated on the basis of the output of the rotational velocity detection means when the traveling state judging means has judged that the vehicle is traveling linearly, wherein the curved path includes a path having an almost constant radius of curvature.

According to the present invention, the discrimination between the state where the vehicle is traveling linearly and the state where it is traveling on a path having an almost constant radius of curvature is made. When the vehicle is traveling on a path having an almost constant radius of curvature, therefore, it is not erroneously judged that the vehicle is traveling linearly. Consequently, it is possible to obtain an initial correction factor faithfully representing the difference in effective rolling radius depending on the initial difference between the tires. If the present invention is applied to a tire pressure drop detecting device, therefore, it can be reliably judged whether or not the air pressure in the tire has dropped.

Even if it is not examined whether or not a state where it is judged that the vehicle is traveling linearly is continuing for a predetermined time period, the discrimination between the state where the vehicle is traveling linearly and the state where it is traveling on a path having an almost constant radius of curvature can be reliably made because the above-mentioned processing for judging the traveling state of the vehicle is performed. Even on a short straight road, it can be reliably recognized that the vehicle is traveling linearly.

The traveling state judging means may include means for calculating the ratio of the rotational velocities of the right and left tires on the basis of the output of the rotational velocity detection means, and means for judging whether or not the difference or ratio between the calculated ratio of the rotational velocities of the right and left tires and reference data corresponding to the ratio of the rotational velocities of the right and left tires previously calculated, is less than a predetermined threshold, and judging that the vehicle is traveling linearly when it is judged that the difference or ratio is not more than the threshold, for example.

When the vehicle is traveling on a road having an almost constant radius of curvature, the ratio between the rotational velocities of the right and left tires generally falls in a predetermined range. If the above-mentioned threshold is set to a value which is less than the minimum value of a range in which the difference or the ratio falls, therefore, the discrimination between the state where the vehicle is traveling linearly traveling and the state where it is traveling on a road having an almost constant radius of curvature, can be reliably made.

The factor calculation means may average the ratio of the rotational velocities of the right and left tires which is obtained on the basis of the output of the rotational velocity detection means, and the initial correction factor previously found to calculate an initial correction factor. In this case, the initial correction factor found by the factor calculation means may be used as the reference data in the traveling state judging means.

In the present invention, the initial correction factor is found by performing average processing, whereby the precision of the initial correction factor is improved as the initial correction factor is calculated. Consequently, the precision of the judgment processing in the traveling state judging means utilizing such an initial correction factor as reference data is improved as the initial correction factor is repeatedly calculated. Therefore, it can be more reliably recognized that the vehicle is traveling linearly.

The device according to one embodiment of the present invention further comprises means for calculating a time-differentiated value of a value corresponding to the turning radius of the vehicle (for example, the reciprocal of the turning radius) on the basis of the output of the rotational velocity detection means, and means for allowing judgment processing in the traveling state judging means to be performed on condition that the calculated time-differentiated value falls in a predetermined allowable range.

When the vehicle is traveling linearly, the reciprocal of the turning radius of the vehicle is stable at an offset value corresponding to a variation due to the initial difference between the right and left tires, for example.

Consequently, the time-differentiated value is approximately zero. When the time-differentiated value falls in the allowable range, therefore, it can be presumed that the vehicle is traveling linearly. The traveling state judging processing can that exclude a state where the possibility that the vehicle is traveling linearly is low, for example, a case where the vehicle is going to turns at a right angle corner. Specifically, the discrimination processing is performed only when it is presumed that the vehicle is traveling linearly, whereby the efficiency of the processing can be increased.

The device according to one embodiment of the present invention further comprises (1) means for averaging the ratio of the rotational velocities of the right and left tires which is obtained on the basis of the output of the rotational velocity detection means and initial data previously found, to update the initial data, (2) means for recording the number of times the initial data is calculated (hereinafter "number of calculations"), (3) for judging whether or not the recorded number of calculations has reached a predetermined threshold, means for inhibiting the judgment processing by the traveling state judging means until said recorded number of calculations has been judged to reach the threshold, and (5) means for setting the initial data as reference data to be used first by the traveling state judging means. In this case, the device may further comprise means for finding (updating) the initial data if the calculated time-differentiated value falls in an allowable range.

In this construction, the judgment processing by in the traveling state judging means is inhibited until the recorded number of calculations of the initial data corresponding to the ratio of the rotational velocities of the right and left tires reaches the threshold. In other words, the judgment processing by the traveling state judging means is not performed until the recorded number of calculations of the initial data reaches the threshold. In this case, initial data calculated after the recorded number of calculations reaches the threshold is used as the reference data to be used for the first traveling state judgment processing.

The initial data is found by the averaging processing when it can be presumed that the vehicle is traveling linearly. When the recorded number of calculations reaches the threshold, the initial data has sufficient precision. Consequently, the judgment processing can be performed with high precision from the beginning. Accordingly, it can be more reliably recognized that the vehicle is traveling linearly.

Furthermore, the device according to the present invention may further comprise means for recording the number of times that a judgment is made by the traveling state judging means that the vehicle is traveling on a curved path (hereinafter "recorded number of curved path judgments") means, means for judging whether or not this recorded number of curved path judgments has reached a predetermined threshold, and means for initializing the initial correction factor when the recorded number of curved path judgments has reached the threshold.

Since the initial data is found before the traveling state judgment processing is performed, it may be actually found in a case where the vehicle is traveling on a road having an almost constant radius of curvature. In this case, the found initial data deviates from a true value which should be obtained when the vehicle is linearly traveling. If such initial data is used, therefore, it is difficult to discriminate the state where the vehicle is linearly traveling from the other state. Thus, there is a possibility that a precise initial correction factor cannot be found.

The initial correction factor is calculated again from the beginning in a case where the recorded number of curved path judgments (for example, judgments that a road has an almost constant radius of curvature) reaches the threshold. Although a time period elapsed until the factor is acquired is extended, a precise initial correction factor can be reliably obtained.

It is preferable that the device according to the present invention further comprises means for clearing the recorded number of the recorded number of curved path judgments has reached that the vehicle is traveling linearly.

A method for calculating a correction factor according to the present invention comprises a traveling state judging step for Judging whether the vehicle is traveling linearly or the vehicle is traveling on a curved path, on the basis of an output of a rotational velocity detection means, and a factor calculating step for finding an initial correction factor for eliminating the effect curved path judgments, when the traveling stating judging means judges of a difference in effective rolling radius between the tires depending on an initial difference on the basis of the output of the rotational angular velocity detection means when the vehicle is judged to be traveling linearly.

In this case, it is preferable that the traveling state judging step comprises the steps of calculating the ratio of the rotational velocities of the right and left tires, and judging that the vehicle is traveling linearly if the difference, or ratio between the calculated ratio of the rotational velocities of the right and left tires and reference data is not more than a predetermined threshold, while judging that the vehicle is traveling on a curved route if the difference, or ratio between the calculated ratio of the rotational velocities of the right and left tires and the reference data exceeds the threshold.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
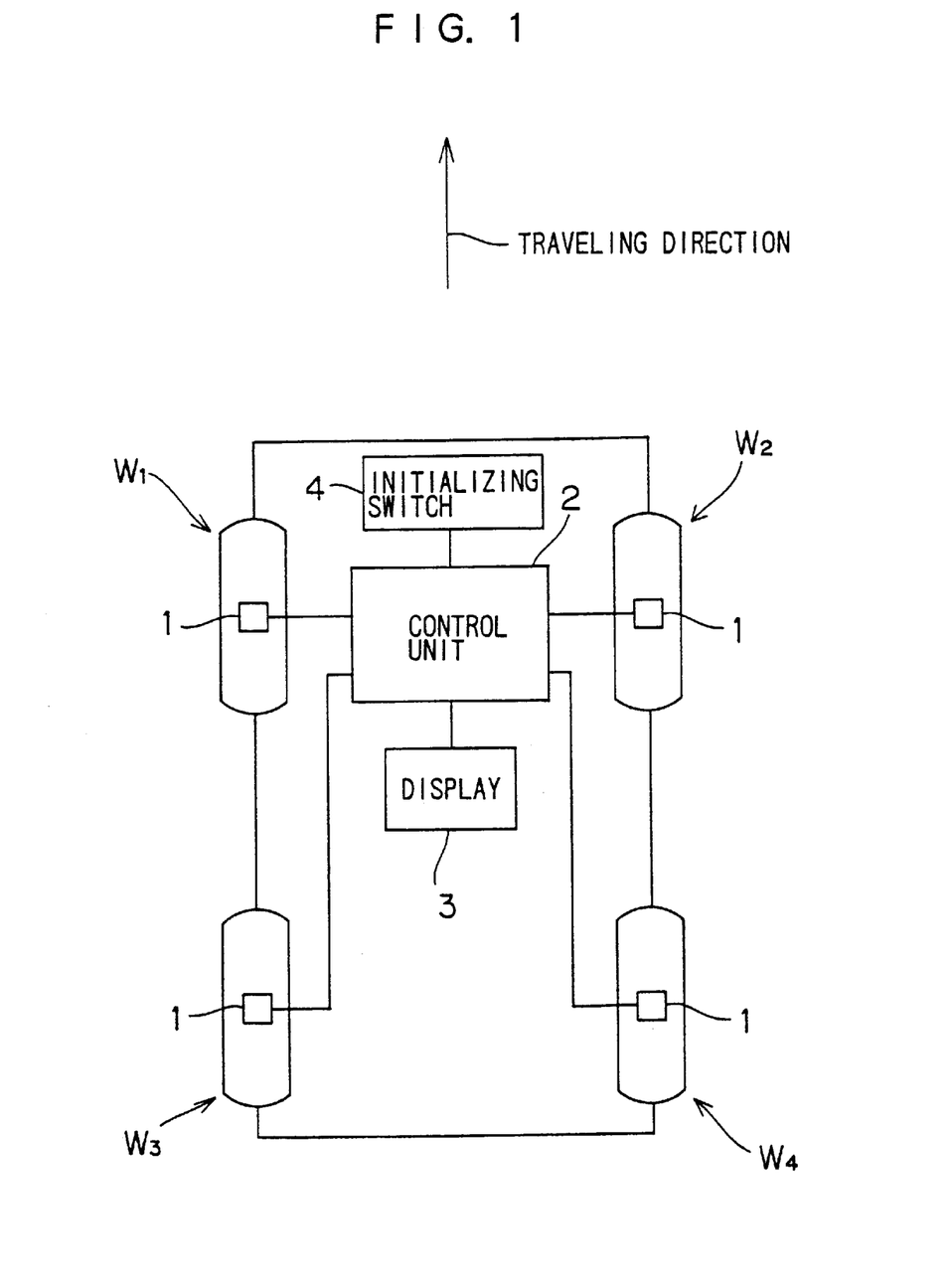
FIG. 1 is a block diagram showing the construction of a tire pressure drop detecting device to which one embodiment of the present invention is applied.

FIG. 1 is a block diagram showing the construction of a tire pressure drop detecting device to which one embodiment of the present invention is applied. The tire pressure drop detecting device judges whether or not the air pressure of any one of four tires $W_1$, $W_2$, $W_3$, and $W_4$ provided on a four-wheel vehicle drops. The tires $W_1$ and $W_2$ respectively correspond to right and left front tires. The tires $W_3$ and $W_4$ respectively correspond to right and left rear tires.

A wheel speed sensor 1 is provided in relation to each of the tires $W_1$, $W_2$, $W_3$, and $W_4$. The outputs of the wheel speed sensors 1 are fed to a control unit 2.

A display 3 is connected to the control unit 2. The display 3 is for reporting the tire $W_i$ (i=1, 2, 3, 4) whose air pressure drops, and is constituted by a liquid crystal display, a plasma display, a CRT (Cathode-Ray Tube), or the like.

An initializing switch 4 is also connected to the control unit 2. The initializing switch 4 is operated by a user in calculating an initial correction factors $K_j$ (i=1, 2). The initial correction factors $K_j$ are for eliminating from the rotational velocities $F_i$ of the tires $W_i$ the effect of a variation, within a production tolerance, in effective rolling radius depending on (caused by) an initial difference between the tires $W_i$.

Figure 2:
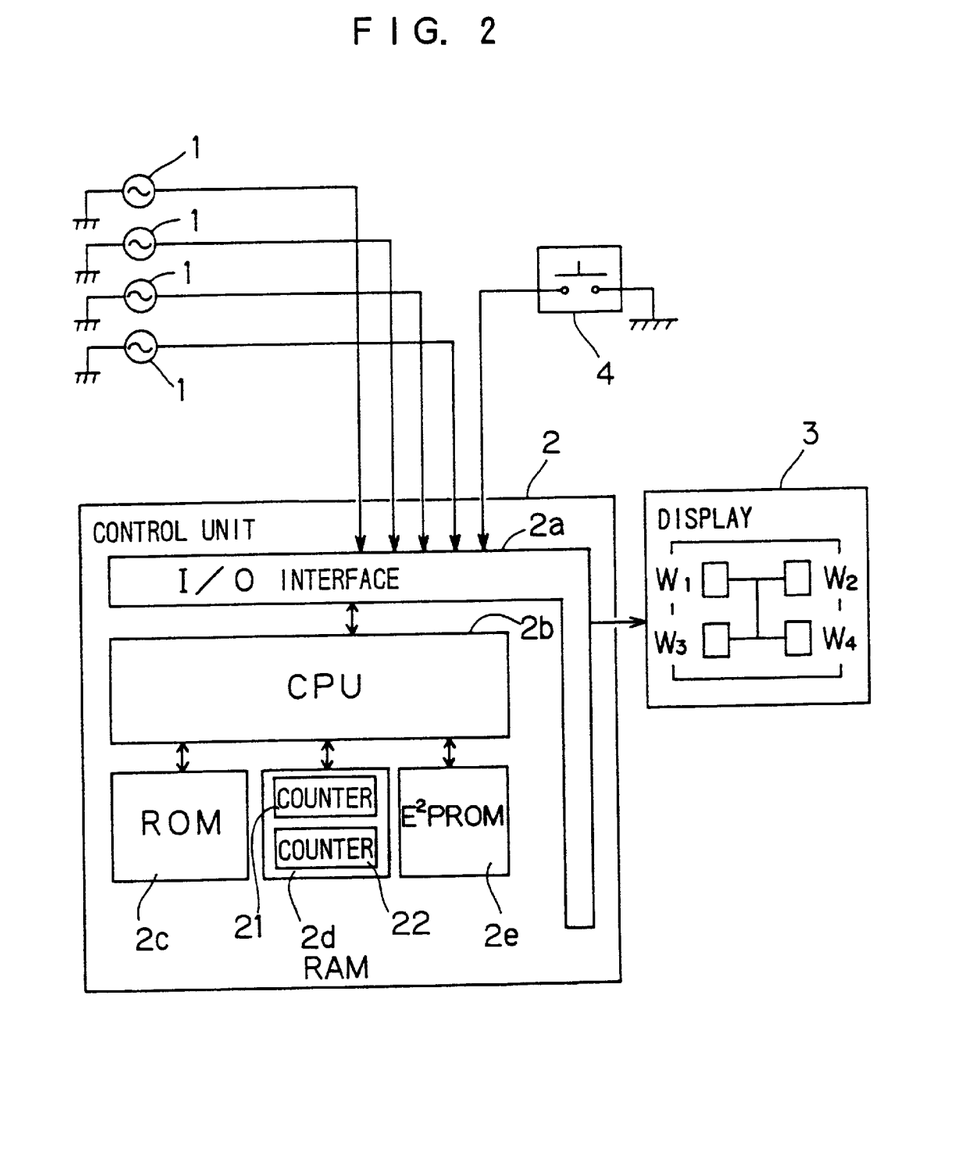
FIG. 2 is a block diagram showing the electrical construction of the tire pressure drop detecting device.

FIG. 2 is a block diagram showing the electrical construction of the tire pressure drop detecting device. The control unit 2 is constituted by a microcomputer comprising an I/O interface 2a, a CPU 2b, a ROM 2c, a RAM 2d, and an EEPROM 2e.

The I/O interface 2a is required to deliver signals to external devices such as the wheel speed sensors 1 and the initializing switch 4. The CPU 2b is for performing various operation processing in accordance with a control operation program stored in the ROM 2c. The RAM 2d is one to which data or the like is temporarily written when the CPU 2b performs a control operation and from which the written data or the like is read out. A part of a storage area of the RAM 2d is utilized as counters 21 and 22 used in STD (Straight Running Determination) as described later for calculating initial correction factors $K_j$. The EEPROM 2e stores the initial correction factors $K_j$ calculated as in the STD processing.

Each of the wheel speed sensors 1 outputs a pulse signal corresponding to the speed of rotation of the tire $W_i$ (hereinafter referred to as "wheel speed pulses"). In the CPU 2b, the rotational velocity $F_i$ of each of the tires $W_i$ is calculated for each predetermined sampling period $\Delta T$ (for example, $\Delta T=1$ (sec)) on the basis of the wheel speed pulses outputted from the wheel speed sensor 1.

Figure 3:
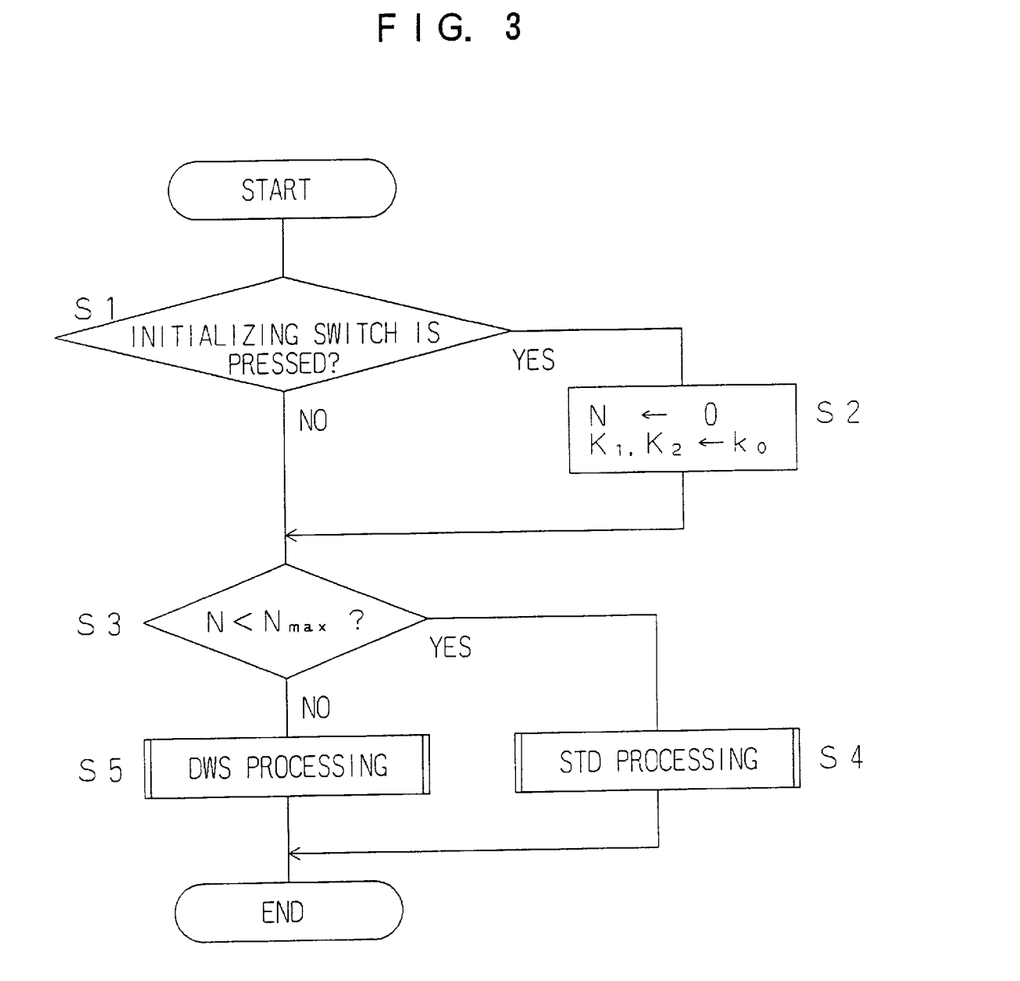
FIG. 3 is a flow chart for explaining tire pressure drop detection processing.

FIG. 3 is a flow chart for explaining processing for detecting the drop in the air pressure of a tire in the tire pressure drop detecting device. The processing is performed for each sampling period $\Delta T$ in the control unit 2 by the CPU 2b operating in accordance with the predetermined program stored in the ROM 2c. In the following description, it is presupposed that an objective vehicle is an FF (front engine front drive) vehicle.

The CPU 2b first judges whether or not the initializing switch 4 is pressed (step S1). The initializing switch 4 is generally pressed by a user when the vehicle is first caused to travel, the tire $W_i$ is filled with air, or the tire $W_i$ is replaced. In other words, the initializing switch 4 is generally pressed before a trip is started or immediately after the trip is started.

When the initializing switch 4 is pressed, the CPU 2b judges that an instruction to execute the STD processing is issued, and preparation for execution of the STD processing is undertaken (step S2). Specifically, a count value N of the counter 21 corresponding to the number of times that the initial correction factors $K_j$ is calculated, is cleared. Further, the initial correction factors $K_1$ and $K_2$ are respectively set to initial values $k_0$ (for example, $k_0=1.0$). Thereafter, the program proceeds to the step S3. On the other hand, when it is judged that the initializing switch 4 is not pressed, the program proceeds directly to the step S3.

In the tire pressure drop detection processing, the initial correction factors $K_j$ are calculated a plurality of times for each sampling period $\Delta T$ in the STD processing, and obtained values are averaged, to calculate precise initial correction factors $K_j$. That is, the initial correction factors $K_j$ are calculated by filter processing for each sampling period $\Delta T$. Consequently, the precision is increased every time the calculation is done.

The CPU 2b judges whether or not the count value N reaches its maximum value $N_{max}$ (for example, $N_{max}=500$) in the step S3. If the count value N is less than the maximum value $N_{max}$, it is considered that the precision of the initial correction factors $K_j$ is still insufficient, so that the STD processing is executed (step S4). On the other hand, when it is judged that the count value N has reached the maximum value $N_{max}$, it is considered that sufficiently precise initial correction factors $K_j$ are obtained, so that normal tire pressure drop judgment processing (hereinafter referred to as "DWS processing") is executed (step S5).

The DWS processing will be briefly described. In the DWS processing, the rotational velocity $F_i$ of each of the tires $W_i$ is calculated on the basis of the wheel speed pulses outputted from the respective vehicle speed sensor 1. The calculated rotational velocities $F_i$ are then subjected to initial correction processing. Specifically, the initial correction factors $K_j$ calculated in the STD processing are used, so that processing as expressed by the following equations (3) to (6) is performed:

$$F1_1=F_1 \quad (3)$$

$$F1_2=K_1\times F_2 \quad (4)$$

$$F1_3=F_3 \quad (5)$$

$$F1_4=K_2\times F_4 \quad (6)$$

Consequently, rotational velocities $F1_j$, from which the effect of differences in effective rolling radius depending on initial differences among the tires $W_i$ is eliminated, are obtained. As is apparent from the foregoing equations (3) to (6), the initial correction factor $K_1$ is a factor for eliminating the effect of the difference in effective rolling radius depending on the initial difference between the right and left front tires $W_1$ and $W_2$. Further, the initial correction factor $K_2$ is a factor for eliminating the effect of the difference in effective rolling radius depending on the initial difference between the right and left rear tires $W_3$ and $W_4$.

Thereafter, a judged value D, used for judging the drop in air pressure, is calculated, as expressed by the following equation (7) on the basis of the rotational velocities $F1_i$ thus obtained:

$$D = \frac{\frac{F1_1 + F1_4}{2} - \frac{F1_2 + F1_3}{2}}{\frac{F1_1 + F1_2 + F1_3 + F1_4}{4}} \times 100 \quad (7)$$

It is then judged whether or not the air pressure has dropped on the basis of the calculated judged value D. Specifically, it is judged whether or not the judged value D satisfies the following expression (8). In the following expression (8), $D_{TH1}=D_{TH2}=0.1$, for example:

$$D>-D_{TH1} \text{ or } D>D_{TH2} \quad (8)$$

If the judged value D satisfies the foregoing expression (8), it is judged that the air pressure of at least one of the tires $W_i$ has dropped. On the other hand, if the judged value D does not satisfy the foregoing expression (8), it is judged that there is no tire $W_i$ whose air pressure has dropped.

When it is judged that there is a tire $W_i$ whose air pressure has dropped, data representing the judgment is fed to the display 3. In the display 3, the judgment that there is a tire $W_i$ whose air pressure has dropped is displayed.

Figure 4:
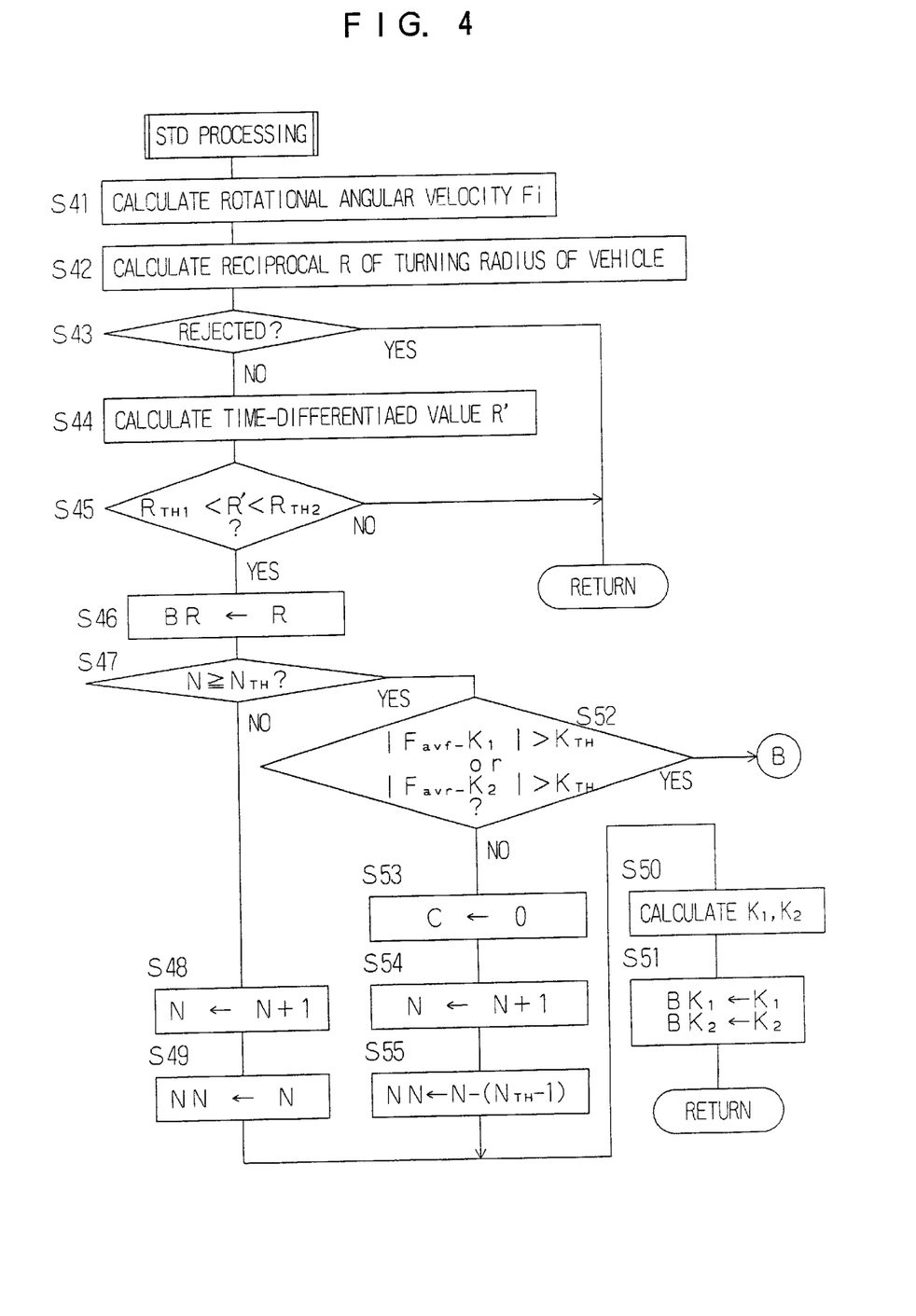
FIGS. 4 and 5 are flow charts for explaining STD (Straight Running Determination) processing.
Figure 5:
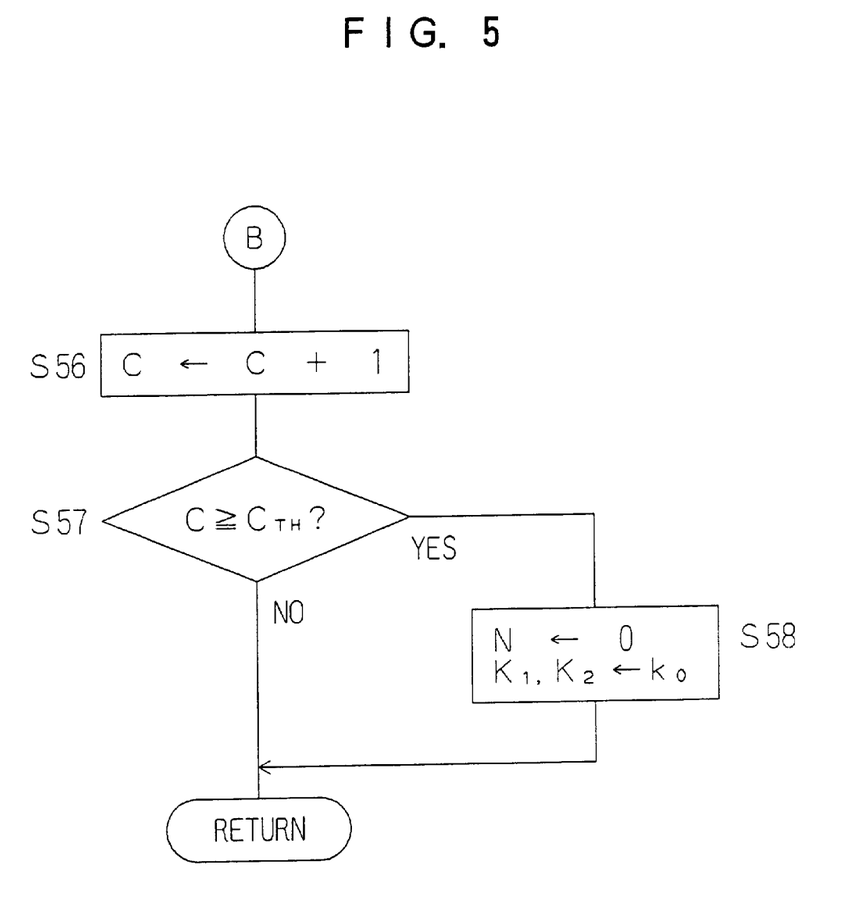

FIGS. 4 and 5 are flow charts for explaining the STD processing. The CPU 2b first calculates the respective rotational velocities $F_i$ of the tires $W_i$ on the basis of the wheel speed pulses outputted from the wheel speed sensors 1 (step S41). Further, the reciprocal R of the turning radius of the vehicle, which is a parameter for grasping the current traveling state of the vehicle, is calculated on the basis of the calculated rotational velocities $F_i$ (step S42). The reason why the reciprocal of the turning radius of the vehicle, and not the turning radius of the vehicle, is taken as a parameter is that the value of the turning radius of the vehicle increases to infinity at a time of linear travel, which is unsuitable for the processing in the CPU 2b, while the value of the reciprocal reaches zero at a time of linear travel, which makes the processing in the CPU 2b easy. The reciprocal R of the turning radius of the vehicle is calculated in accordance with the following equation (9):

$$R = \frac{2}{Tw} \times \frac{F_3 - F_4}{F_3 + F_4} \quad (9)$$

where Tw is the distance between left and right tires.

The rotational angular velocities $F_i$ may include errors depending on the speed of the vehicle (vehicle speed) V and the front/rear acceleration (forward/reverse acceleration or acceleration/deceleration) $FRA_i$ of each of the tires $W_i$. Specifically, when the vehicle speed V is low, the precision of detection by the vehicle speed sensors 1 is significantly degraded, so that it is highly possible that the calculated rotational velocities $F_i$ include errors. Further, when the front/rear acceleration $FRA_i$ of each of the tires $W_i$ is high, the effect of slip of the tire $W_i$ due to rapid acceleration/rapid deceleration of the vehicle, for example, is considered, so that it is highly possible that the calculated rotational velocities $F_i$ include errors.

When it is thus highly possible that the rotational velocities $F_i$ include errors, it is preferable that the calculated rotational velocities $F_i$ are rejected without being employed for detecting the drop in air pressure.

Therefore, the CPU 2b calculates the vehicle speed V and the front/rear acceleration $FRA_i$ of each of the tires $W_i$ on the basis of the rotational angular velocity $F_i$ calculated in the step S41. In step S43 it is judged whether or not the rotational velocities $F_i$ calculated in the present sampling period $\Delta T$ should be rejected on the basis of the vehicle speed V and the front/rear acceleration $FRA_i$ of each other tires $W_i$ which are calculated.

More specifically, the vehicle speed V is calculated on the basis of the speed $V_i$ of each of the tires $W_i$. The speed $V_i$ of each of the tires $W_i$ is calculated in accordance with the following equation (10), where r is a constant corresponding to the effective rolling radius at the time of linear travel, and is stored in the ROM 2c:

$$V_i = r \times F_i \quad (10)$$

The vehicle speed V is calculated by the following equation (11) on the basis of the calculated speed $V_i$ of each of the tires $W_i$:

$$V = (V_1 + V_2 + V_3 + V_4)/4 \quad (11)$$

The front/rear acceleration $FRA_i$ of each of the tires $W_i$ is calculated by the following equation (12), letting $BV_i$ be the speed of the tire $W_i$ calculated in the preceding sampling period $\Delta T$:

$$FRA_i = (V_i - BV_i)/(\Delta T \times 9.8) \quad (12)$$

9.8 is inserted in the denominator in the foregoing equation (12) in order to convert the front/rear acceleration $FRA_i$ of each of the tires $W_i$ to a value in the unit of g (gravity acceleration).

It is then judged whether or not at least one of the following two conditions (1) and (2) is satisfied with respect to the vehicle speed V and the front/rear acceleration $FRA_i$ of each of the tires $W_i$ which are calculated:

(1) $V < V_{TH}$ (for example, $V_{TH} = 15$ (km/h))

(2) MAX $\{|FRA_i|\} > A_{TH}$ (for example, $A_{TH} = 0.1$ g:g=9.8 (m/sec$^2$))

As a result, when either one of the foregoing conditions (1) and (2) is satisfied, the rotational velocities $F_i$ are rejected, so that the program proceeds to the subsequent processing without performing any calculation. On the other hand, when neither one of the foregoing conditions (1) and (2) is satisfied, the rotational velocities $F_i$ are not rejected, so that processing for judging whether or not the vehicle is traveling linearly is performed.

More specifically, the CPU 2b pays attention to the fact that when the vehicle is traveling linearly, the turning radius of the vehicle hardly changes over time, so that a time-differentiated value R' of the reciprocal R of the turning radius of the vehicle is calculated, as expressed by the following equation (13) (step S44). In the following equation (13), BR is the reciprocal of the turning radius of the vehicle which is calculated in the preceding sampling period $\Delta T$, and is held in the RAM 2d:

$$R' = dR/dt = |R - BR|/\Delta T \quad (13)$$

It is judged whether or not the calculated time-differentiated value R' falls in a predetermined allowable range $R_{TH}$ (where $R_{TH}$ represents a range of not less than $R_{TH1}$ nor more than $R_{TH2}$: for example, $R_{TH1} = -0.0005$, and $R_{TH2} = 0.0005$) (step S45). If the time-differentiated value R' is outside the allowable range $R_{TH}$, it is judged that the vehicle is not traveling linearly. In this case, the rotational velocities $F_i$ include errors caused by skidding of the tires $W_i$. If the rotational velocities $F_i$ are used, therefore, a precise initial correction factors $K_j$ cannot be calculated. In this case, therefore, the rotational velocities $F_i$ are rejected, so that the program proceeds to the subsequent processing without calculations. On the other hand, if the time-differentiated value R' falls in the allowable range $R_{TH}$, it is judged that the vehicle is traveling linearly. In this case, the rotational velocities $F_i$ faithfully represent a difference in effective rolling radius depending on an initial difference between the tires $W_i$. After the reciprocal R of the turning radius of the vehicle, which is calculated in the step S42, is held as BR in the RAM 2d (step S46), processing for calculating the initial correction factors $K_j$, using the rotational velocities $F_i$, are performed.

Figure 6:
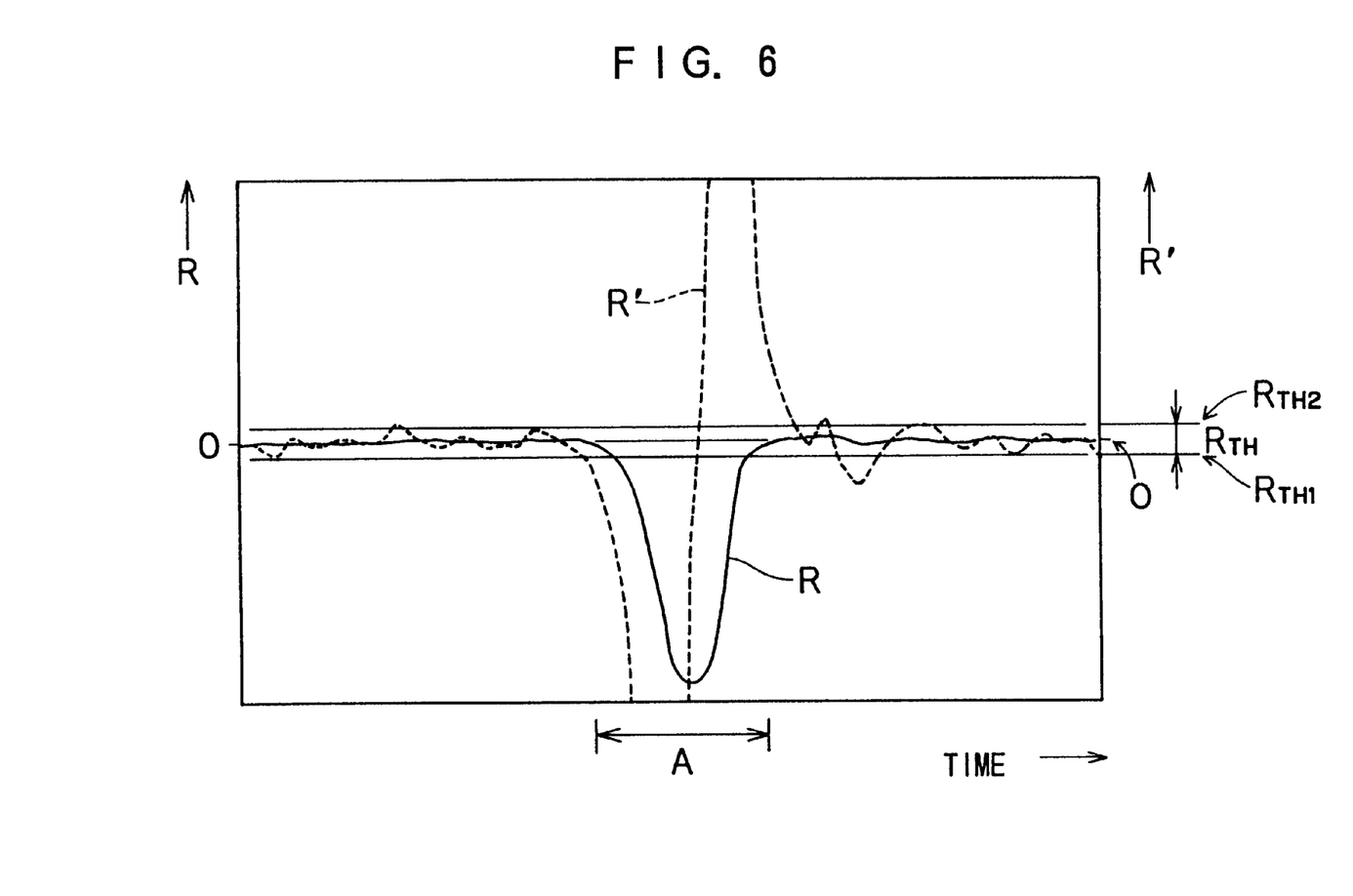
FIG. 6 is a diagram showing both the reciprocal of the turning radius of a vehicle in a case where the vehicle is turning a right angle corner, and its time-differentiated value.

When the vehicle turns a right angle corner, for example, it can be reliably judged in the step S45 that the vehicle is not traveling linearly. As an example, in a period A during which the vehicle turns a right angle corner, as shown in FIG. 6, the reciprocal R of the turning radius of the vehicle indicted by a solid line is increased, so that its time-differentiated value R' indicated by a broken line greatly exceeds the allowable range $R_{TH}$.

When the vehicle is traveling on a road that curves with a constant radius of curvature (hereinafter referred to as a "constant-R road"), such as an exit road of an interchange of a highway, however, it may be erroneously judged in the step S45 that the vehicle is traveling linearly. The reason for this is that the turning radius of the vehicle is approximately constant on the constant-R road, so that the time-differentiated value R' is approximately zero.

Figure 7:
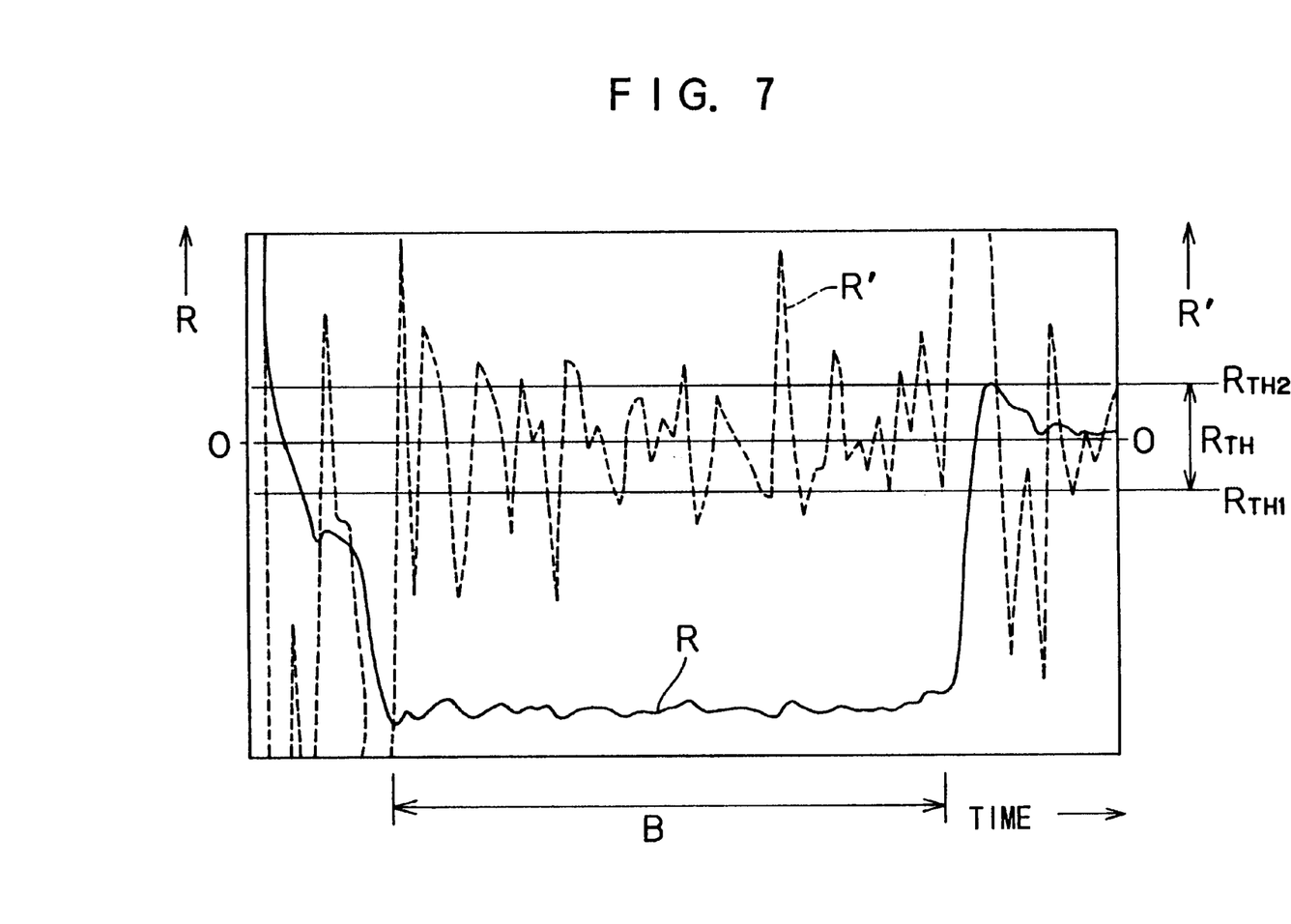
FIG. 7 is a diagram showing both the reciprocal of the turning radius of a vehicle in a case where the vehicle is traveling on a constant-R road having a radius of curvature of 40 m and its time-differentiated value.

As an example, in a period B during which the vehicle is traveling on a constant-R road having a radius of curvature of 40 meters (m), the reciprocal R of the turning radius of the vehicle is approximately constant, so that its time-differentiated value R' falls in the allowable range $R_{TH}$, which slightly varies, in many cases, as shown in FIG. 7. Therefore, it may be erroneously judged that the vehicle is traveling linearly.

Figure 8:
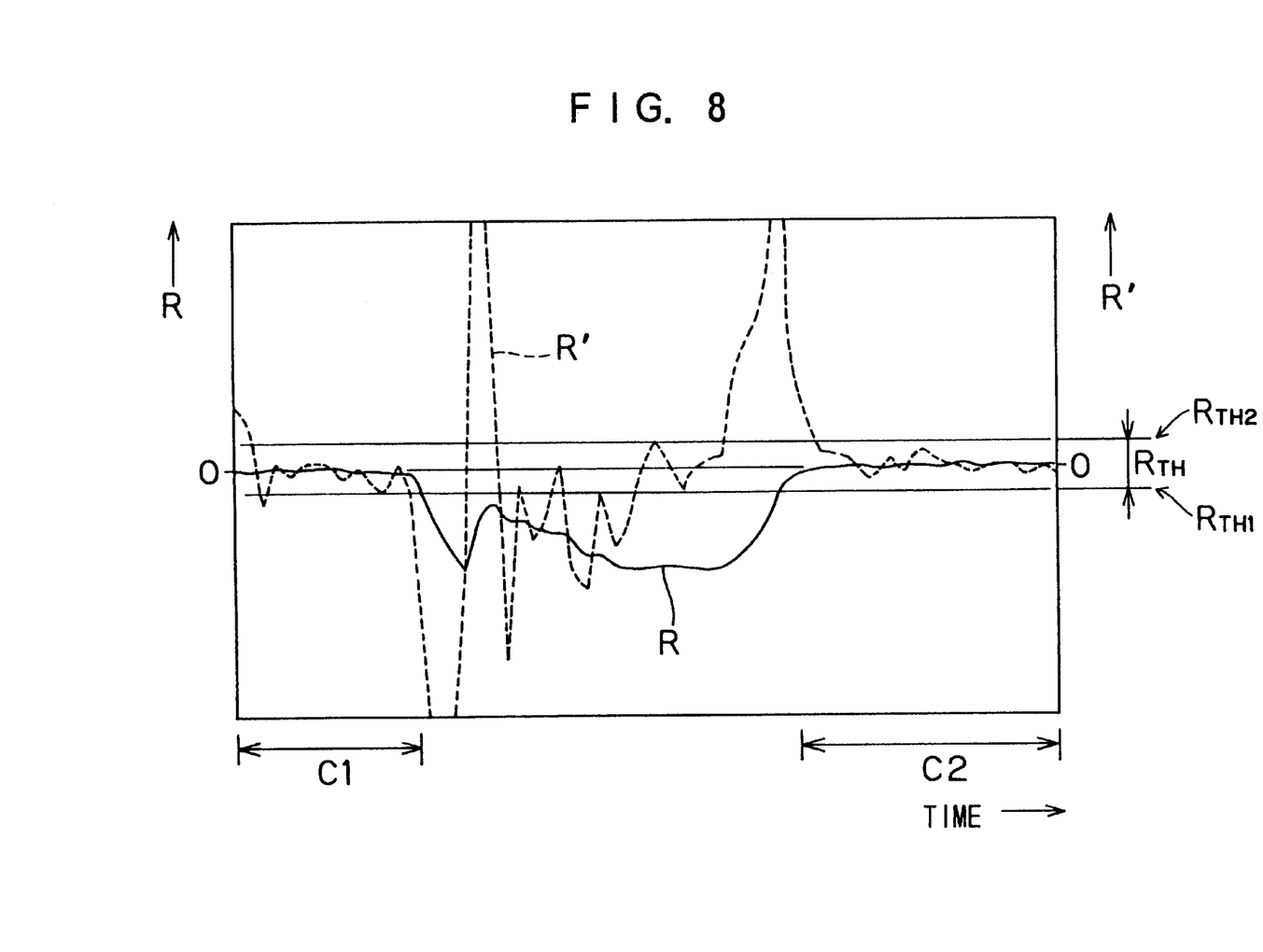
FIG. 8 is a diagram showing both the reciprocal of the turning radius of a vehicle in a case where the vehicle is traveling on an exit road of an interchange having a radius of curvature of 50 m, and its time-differentiated value.

When the vehicle is traveling on an exit road of an interchange having a radius of curvature of 50 m, there are periods during which the reciprocal R of the turning radius of the vehicle is approximately zero, for example, periods C1 and C2, as shown in FIG. 8. Its time-differentiated value R' in these periods falls in the allowable range $R_{TH}$.

Figure 9:
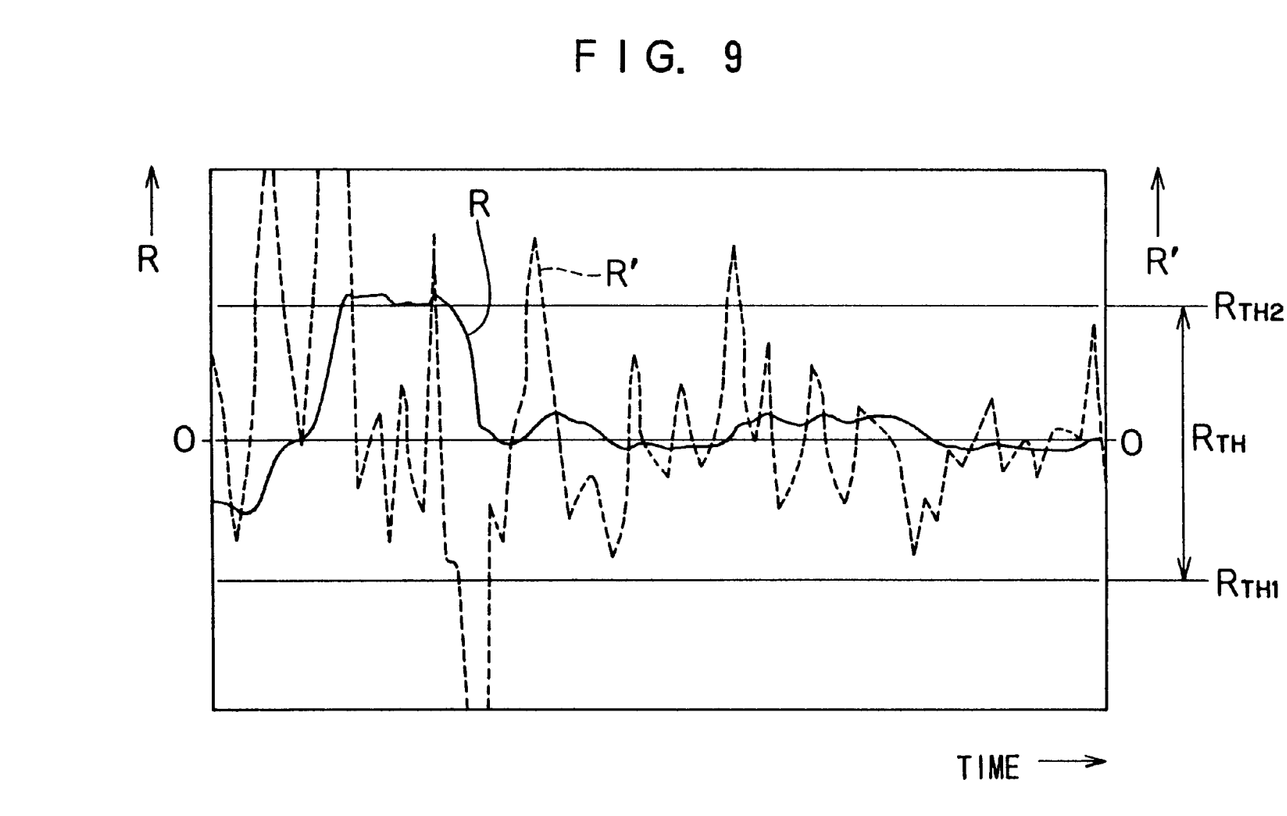
FIG. 9 is a diagram showing both the reciprocal of the turning radius of a vehicle in a case where the vehicle is traveling on an exit road of an interchange having a radius of curvature of 200 m, and its time-differentiated value.

Furthermore, when the vehicle is traveling on an exit road of an interchange having a radius of curvature of 200 m, a period during which the reciprocal R of the turning radius of the vehicle is in the vicinity of zero is long, so that a period during which its time-differentiated value R' falls in the allowable range $R_{TH}$ is also long, as shown in FIG. 9.

When the vehicle is thus traveling on an exit road of an interchange, it may be erroneously judged that the vehicle is traveling linearly, without depending on the radius of curvature.

On the other hand, when the vehicle is traveling on a constant-R road, the ratio of the rotational velocities of the right and left tires only changes slightly with the lapse of time, as described above. Specifically, the radius of curvature of an exit road of an interchange which is a typical example of a constant-R road, is generally 60 to 500 meters. In this case, a variation in the ratio of the rotational velocities of the right and left tires is 4 (%) to 1 (%) on average. In the STD processing, therefore, a threshold is set at a value which is less than the minimum value of a range in which the ratio of the rotational velocities of the right and left tires falls, in order to perform processing for discriminating between a state where the vehicle is traveling on the constant-R road and a state where it is traveling linearly (hereinafter referred to as supplemental discrimination processing).

Examples of reference data for the supplemental discrimination processing include the initial correction factor $K_1$ corresponding to the ratio of the rotational velocities of the right and left front tires $W_1$ and $W_2$ and the initial correction factors $K_2$ corresponding to the ratio of the rotational velocities of the right and left rear tires $W_3$ and $W_4$. On the other hand, each of the factors $K_1$ and $K_2$ is calculated by performing filter processing for each sampling period $\Delta T$, whereby the precision of the factors is increased every time the calculation is performed. In the STD processing, therefore, the above-mentioned supplemental discrimination processing is performed after the precision of each of the initial correction factors $K_1$ and $K_2$ which is the reference data is sufficiently increased. Consequently, the supplemental discrimination processing can be performed with high precision from the beginning. In the present embodiment, the initial correction factors $K_1$ and $K_2$ in a period before the precision is sufficiently increased, correspond to initial data.

The CPU 2b judges whether or not a count value N of a counter 21 is not less than a predetermined threshold $N_{TH}$ (for example, $N_{TH}$=11) prior to performing the above-mentioned supplemental discrimination processing (step S47). If the count value N is less than the threshold $N_{TH}$, it is judged that the precision of the initial correction factors $K_1$ and $K_2$ serving as the reference data is still insufficient, so that the initial correction factors $K_j$ are directly calculated without performing the supplemental discrimination processing. Specifically, the count value N of the counter 21 is incremented by "1" (step S48), so that the number of calculations of the initial correction factors $K_j$ is recorded. The count value N is then substituted in the number of data required for averaging (hereinafter referred to as "the number for averaging") (step S49), after which the initial correction factors $K_j$ are calculated in accordance with the following equations (14) and (15) (step S50). In the following equations (14) and (15), $BK_j$ represents the preceding initial correction factor $K_j$:

$$K_1 = \frac{NN-1}{NN} \times BK_1 + \frac{1}{NN} \times \frac{F_2}{F_1} \quad (14)$$

$$K_2 = \frac{NN-1}{NN} \times BK_2 + \frac{1}{NN} \times \frac{F_4}{F_3} \quad (15)$$

The calculated initial correction factors $K_j$ are held as $BK_j$ in the RAM 2d (step S51).

When the count value N reaches the threshold $N_{TH}$ after repeating the foregoing processing, it is judged that initial correction factors $K_1$ and $K_2$ having sufficient precision are obtained as the reference data, so that the supplemental discrimination processing is performed (step S52). More specifically, it is judged whether or not the difference $|Farf-k_1|$ between the ratio $F_{avf}$ for the present sampling period, of the rotational velocities $F_1$ and $F_2$ of the right and left front tires $W_1$ and $W_2$, and the initial correction factor $K_1$, is more than a predetermined threshold $K_{TH}$ (for example, $K_{TH}$=0.5 (%)), or the difference between the ratio $F_{avf}$ in the present sampling period of the rotational angular velocities $F_3$ and $F_4$ of the right and left front tires $W_3$ and $W_4$ and the initial correction factor $K_2$ is more than the above-mentioned predetermined threshold $K_{TH}$. More specifically, it is judged whether or not conditions given by the following expression (16) are satisfied:

$$|F_{avf}-K_1|>K_{TH} \text{ or } |F_{avr}-K_2|>K_{TH} \quad (16)$$

When it is judged that neither one of the two conditions given by the foregoing expression (16) is satisfied, it is judged that the vehicle is not traveling on a constant-R road but is traveling linearly. After the count value N is incremented by "1" (step S54), the initial correction factors $K_j$ are calculated. In this case, a value obtained by subtracting ($N_{TH}$−1) from the count value N is substituted, as expressed by the following equation (17), in the number for averaging NN in order to subtract the number of initial correction factors $K_j$ whose precision is still insufficient which are calculated in a period before the supplemental discrimination processing is performed (step S55):

$$NN=N-(N_{TH}-1) \quad (17)$$

The number for averaging NN is substituted in the foregoing equations (14) and (15), to calculate the initial correction factors $K_j$ (step S50).

Processing for clearing the count value C of the counter 22 in the step S53 prior to the step of substituting a numerical value in the number for averaging NN, will be described later.

On the other hand, when it is judged in the foregoing step S52 that either one of the two conditions given by the foregoing expression (16) is satisfied, it is judged that the vehicle is traveling on a constant-R road, so that processing for judging whether or not the initial correction factors $K_j$ should be calculated again from the beginning, skipping the calculation of the initial correction factors $K_j$ in steps S56 to S58. That is, as described in "SUMMARY OF THE INVENTION", the reference data first used in the supplemental discrimination processing in the step S52 may deviate from the true basis which is a value in a case where the vehicle is linearly traveling linearly. In this case, it is necessary to calculate the initial correction factors $K_j$ again, to prevent the precision of the initial correction factors $K_j$ from being decreased.

The above-mentioned judgment processing will be described in more detail. In the CPU 2b, the count value C of the counter 22 is incremented by "1" (step S56), and it is judged whether or not the count value C is not less than a predetermined threshold $C_{TH}$ (for example, $C_{TH}$=100) (step S57). If the count value C is less than the threshold $C_{TH}$, the program proceeds to the subsequent processing without calculation. On the other hand, if the count value C is not less than the threshold $C_{TH}$, it is judged that the initial correction factors $K_j$ are unsuitable as reference data because it has been calculated when the vehicle is traveling on a constant-R road, so that the count value N is cleared, and the initial correction factors $K_j$ are set to an initial value $k_0$ (step S58).

It may, in some cases, be erroneously judged that the vehicle is traveling on a constant-R road by unexpected noise or the like, although the initial correction factors $K_j$ actually have been calculated at a time of linear travel. In such a case, if the count value C remains as it is, the initial correction factors $K_j$ are calculated again, although they have been calculated with high precision. When it is judged in step S52 that the vehicle is traveling linearly therefore, the count value C is cleared (step S53).

As described in the foregoing, according to the present embodiment, the supplemental discrimination processing is performed on the basis of the difference between the ratio of the rotational velocities of the right and left tires and the reference data. When the vehicle is traveling on a constant-R road, for example, therefore, it is not erroneously judged that the vehicle is traveling linearly. In other words, it can be reliably recognized that the vehicle is linearly traveling linearly. Therefore, the initial correction factor can be found with high precision. Accordingly, the effect of the difference in effective rolling radius depending on the initial difference, can be eliminated from the rotational velocities $F_i$. As a result, it can be reliably judged whether or not the air pressure of any one of the tires $W_i$ has dropped.

Even if it is not examined whether or not a state where it is judged that the vehicle is traveling linearly has continued for a predetermined time period, it can be reliably judged whether or not the vehicle is traveling linearly because the above-mentioned supplemental discrimination processing is performed. Accordingly, it can be reliably recognized that the vehicle is traveling linearly even in the case of short linear travel. Therefore, even in an urban district in Japan, where short straight roads and right angle corners connect with each other in may cases, a precise initial correction factors $K_j$ can be rapidly obtained.

Although description has been made of an embodiment of the present invention, the present invention is not limited to the embodiment. For example, in the above-described embodiment, the supplemental discrimination processing is not performed until the count value N reaches the threshold $N_{TH}$ in order to improve the precision of the supplemental discrimination processing from the beginning. However, if importance is attached to simplification of the processing, for example, the supplemental discrimination processing may be performed from the beginning. In this case, as an initial value of the reference data, the average ratio of the rotational velocities of the right and left tires may be used in a case where the vehicle is linearly traveling linearly.

Although in the present embodiment, the supplemental discrimination processing is performed on the basis of the difference between the ratio of the rotational velocities of the right and left tires and the reference data, it may be performed on the basis of the ratio of the rotational velocities of the right and left tires to the reference data. Specifically, when the vehicle is traveling on a constant-R road, the ratio of the rotational velocities of the right and left tires to the reference data generally falls in a predetermined range, similarly to the difference between the ratio of the rotational velocities of the right and left tires and the reference data.

Furthermore, although in the above-mentioned embodiment, it is judged whether or not the vehicle is traveling linearly on the basis of the time-differentiated value R' of the reciprocal R of the turning radius of the vehicle, it goes without saying that it may be judged whether or not the vehicle is traveling linearly on the basis of the time-differentiated value or values of the ratio of the rotational velocities of the right and left tires $W_1$ and $W_2$ and/or the ratio of the rotational velocities of the right and left rear tires $W_3$ and $W_4$, for example.

Although the present invention has been described and illustrated in detail, it is clearly understood that the same is by way of illustration and example only, and is not to be taken by way of limitation, the spirit and scope of the present invention being limited only by the terms of the appended claims.

This application claims priority benefits under 35 USC § 119 of Japanese Patent Application Serial No. 9-44066 filed in the Japanese Patent Office on Feb. 27, 1997, the disclosure of which is incorporated herein by reference.

What is claimed is:

1. A device for calculating correction factors for use in eliminating an effect of a difference in effective rolling radius of left and right tires mounted on a vehicle when determining rotational velocities of the tires, the device comprising:

means, responsive to currently detected rotational velocities of the tires, for calculating a time-differentiation of a value corresponding to a turning radius of the vehicle;

traveling state judging means, responsive to the calculated time-differentiation value falling within a preset allowable range, for judging that the vehicle is traveling linearly; and factor calculation means, responsive to a judgment by the traveling state judging means that the vehicle is traveling linearly, for calculating a correction factor for correcting errors in the detected rotational velocities of the tires based on the differences in effective rolling radius between the tires.

2. The device according to claim 1, wherein the correction factor is an initial correction factor for eliminating an effect on the detected rotational velocities of the tires of differences in the rolling radius of the tires based on preexisting differences between the tires.

3. The device according to claim 1, wherein the traveling state judging means includes:

means for repeatedly calculating a ratio of the detected rotational velocities of the tires, and means for comparing a difference or ratio between a ratio of the rotational velocities currently detected, and reference data based on a calculated ratio of previously detected rotational velocities, and judging that the vehicle currently is traveling linearly if the difference or ratio is less than a threshold value.

4. The device according to claim 3, wherein the factor calculation means averages the calculated ratio of the currently detected rotational velocities with a previously calculated correction factor to update the correction factor, the device further comprising means for updating the reference data used by the traveling state judging means with the updated correction factor.

5. The device according to claim 1, wherein the traveling state judging means includes repeatedly calculating means for repeatedly calculating a rotational velocity ratio of the detected rotational velocities of the tires, means for comparing a difference or ratio between a ratio of the rotational velocities currently detected, and reference data, and judging that the vehicle currently is traveling linearly if the difference or ratio is less than a threshold value, repeatedly updating means for repeatedly updating previously found initial data by averaging with previously found initial data, a ratio of the currently detected rotational velocities calculated by said repeatedly calculating means, means for recording a first number of times that the initial data is updated by the repeatedly updating means, means for judging whether or not the recorded first number of times the initial data is updated has reached a first preset threshold number, means for setting the most recently updated initial data as the reference data when the recorded first number judging means judges that the recorded first number has reached the first preset threshold number, and means for inhibiting the traveling state judging means from judging whether the vehicle is traveling linearly until the recorded first number judging means judges that the recorded first number has reached the first preset threshold number.

6. The device according to claim 1, wherein the traveling state judging means judges whether the vehicle is traveling linearly or on a curved path, based upon detected rotational velocities of the tires, further comprising means for recording a second number of times that the traveling state judging means judges that the vehicle is traveling on a curved path;

means for judging whether the recorded second number of curved path traveling has reached a second preset threshold number; and means for initializing the correction factor when the recorded second number judging means judges that the recorded second number has reached the second preset threshold number.

7. The device according to claim 6, further comprising means, responsive to a judgment by the traveling state judging means that the vehicle is traveling linearly, for clearing the recorded second number.

8. The device according to claim 1, wherein the factor calculation means includes means, responsive to the judgment by the traveling state judging means that the vehicle is traveling linearly, for determining a correction factor for eliminating an effect on the detected rotational velocities of the tires of a difference in the rolling radius of the tires based on preexisting differences among the tires.

9. The device according to claim 1, wherein said means for calculating a time-differentiation includes means for calculating a time-differentiation of the inverse of the turning radius of the vehicle.

10. A method of calculating correction factors for use in eliminating an effect of a difference in effective rolling radius of left and right tires mounted on a vehicle when determining rotational velocities of the tires, the method comprising:

calculating a time-differentiation of a value corresponding to a turning radius of the vehicle, based on currently detected rotational velocities of the tires;

judging that the vehicle is traveling linearly, when the calculated time-differentiation value falls within a preset allowable range means; and calculating a correction factor for correcting errors in the detected rotational velocities of the tires based on the differences in effective rolling radius between the tires when a judgment is made that the vehicle is traveling linearly.

11. The method of calculating correction factors according to claim 10, wherein said judging whether the vehicle is traveling linearly includes:

repeatedly calculating a ratio of the detected rotational velocities of the tires, comparing a difference or ratio between a ratio of the rotational velocities currently detected, and reference data based on a calculated ratio of previously detected rotational velocities, and judging that the vehicle currently is traveling linearly if the difference or ratio is less than a threshold value.

12. The method according to claim 11, wherein calculating a factor includes averaging the calculated ratio of the currently detected rotational velocities with a previously calculated correction factor to update the correction factor, further comprising updating the reference data with the updated correction factor.

13. The method according to claim 10, wherein said judging whether the vehicle is traveling linearly includes repeatedly calculating a rotational velocity ratio of the detected rotational velocities of the tires, comparing a difference or ratio between a ratio of the rotational velocities currently detected, and reference data, and judging that the vehicle currently is traveling linearly if the difference or ratio is less than a threshold value, repeatedly updating previously found initial data by averaging with previously found initial data, a ratio of the currently detected rotational velocities;

recording a first number of times that the initial data is updated, judging whether or not the recorded first number of times the initial data is updated has reached a first preset threshold number;

setting the most recently updated initial data as the reference data when the recorded first number has reached the first preset threshold number; and inhibiting judgment as to whether the vehicle is traveling linearly until the recorded first number has reached the first preset threshold number.

14. The method according to claim 10, wherein the wherein said judging whether the vehicle is traveling linearly includes judging whether the vehicle is traveling linearly or on a curved path, based upon detected rotational velocities of the tires, recording a second number of times that the vehicle is judged to be traveling on a curved path;

judging whether the recorded second number of curved path traveling has reached a second preset threshold number; and initializing the correction factor when the recorded second number has reached the second preset threshold number.

15. The method according to claim 14, further comprising clearing the recorded second number when the vehicle is judged to be traveling linearly.

16. The method according to claim 10, wherein said calculating a time-differentiation of a value includes time-differentiating the inverse of the turning radius of the vehicle to obtain the calculated time-differentiation value.

17. A device for calculating correction factors for use in eliminating an effect of a difference in effective rolling radius of left and right tires mounted on a vehicle when determining rotational velocities of the tires, the device comprising:

traveling state judging means for judging whether the vehicle is traveling linearly or on a curved path, based upon detected rotational velocities of the tires;

means for recording a number of times that the traveling state judging means judges that the vehicle is traveling on a curved path;

means for judging whether the recorded number has reached a preset threshold number;

means for initializing the correction factor when the recorded number judging means judges that the recorded number has reached the preset threshold number;

means for calculating a difference in effective rolling radius between the tires; and factor calculation means, responsive to a judgment by the traveling state judging means that the vehicle is traveling linearly, for calculating a correction factor for correcting errors in the detected rotational velocities of the tires based on the differences in effective rolling radius between the tires.

18. The device according to claim 17, further comprising means, responsive to a judgment by the traveling state judging means that the vehicle is traveling linearly, for clearing the recorded number.

19. A method of calculating correction factors for use in eliminating an effect of a difference in effective rolling radius of left and right tires mounted on a vehicle when determining rotational velocities of the tires, the method comprising:

judging whether the vehicle is traveling linearly, based upon detected rotational velocities of the tires, wherein said judging whether the vehicle is traveling linearly includes judging whether the vehicle is traveling linearly or on a curved path, based upon detected rotational velocities of the tires, recording a number of times that the vehicle is judged to be traveling on a curved path, judging whether the recorded number has reached a preset threshold number, and initializing the correction factor when the recorded number has reached the preset threshold number;

calculating a difference in effective rolling radius between the tires; and calculating a correction factor for correcting errors in the detected rotational velocities of the tires based on the differences in effective rolling radius between the tires when a judgment is made that the vehicle is traveling linearly.

20. The method according to claim 19, further comprising clearing the recorded number when the vehicle is judged to be traveling linearly.

* * * * *